Feb. 9, 1960  B. VOUMARD ET AL  2,923,975
METHOD FOR MOULDING A TUBE OF PLASTIC MATERIAL, DEVICE
FOR CARRYING OUT THIS METHOD AND METHOD
FOR UTILIZING THIS DEVICE
Filed April 12, 1956  5 Sheets-Sheet 1
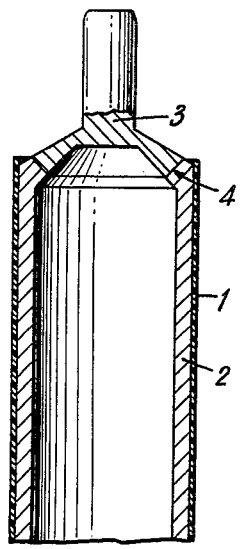
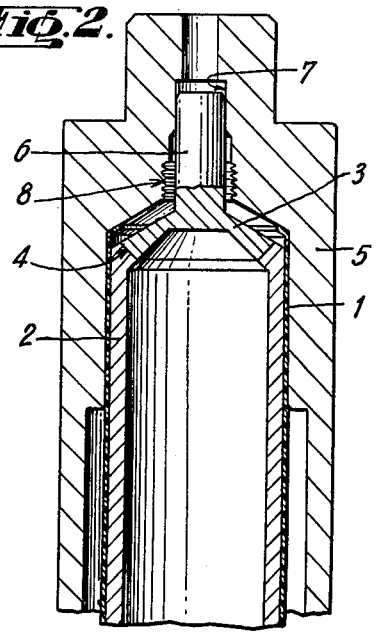
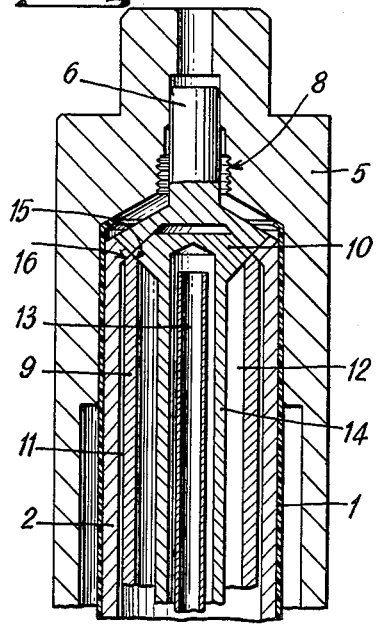
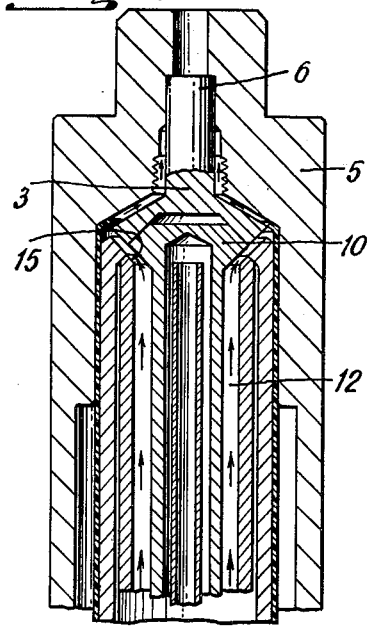
INVENTORS
Bertrand Voumard and
Paul Monnier
By Munn, Liddy, Nathanson & March
ATTORNEYS Feb. 9, 1960   B. VOUMARD ET AL   2,923,975
METHOD FOR MOULDING A TUBE OF PLASTIC MATERIAL, DEVICE
FOR CARRYING OUT THIS METHOD AND METHOD
FOR UTILIZING THIS DEVICE
Filed April 12, 1956   5 Sheets-Sheet 2
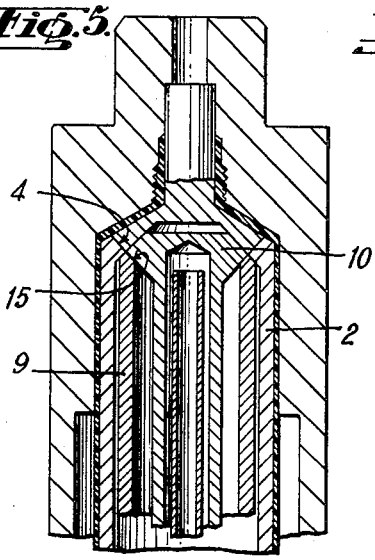
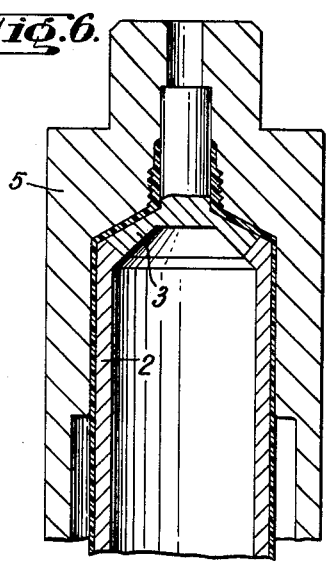
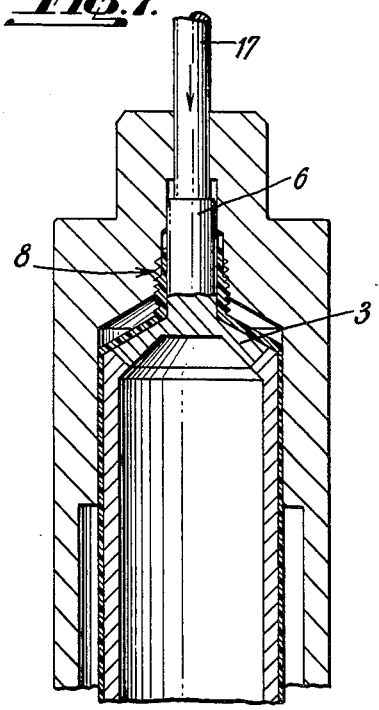
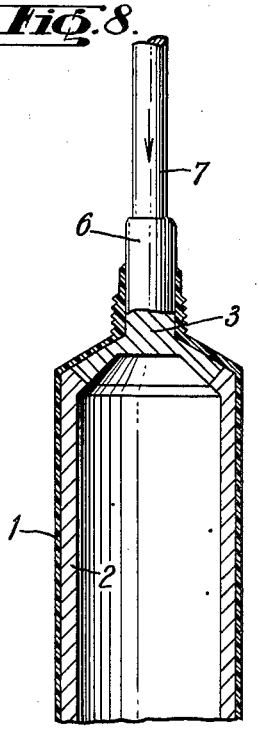
INVENTORS
Bertrand Voumard and
Paul Monnier
By Munn, Liddy, Nathanson & March
ATTORNEYS

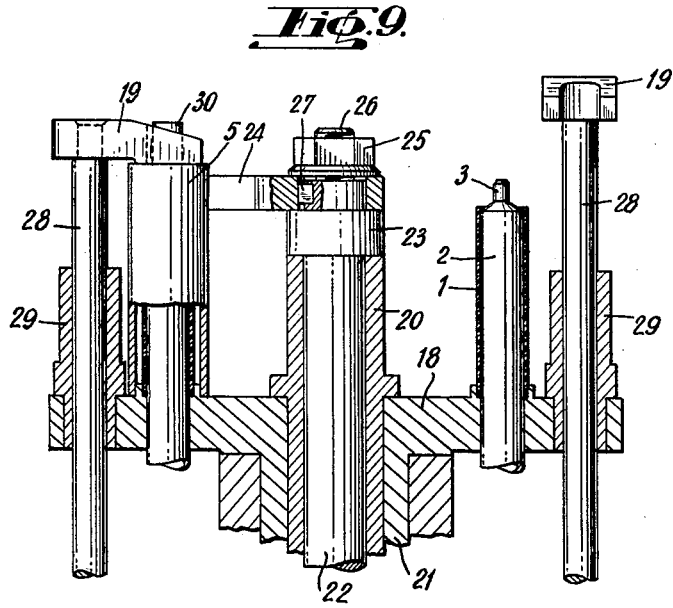
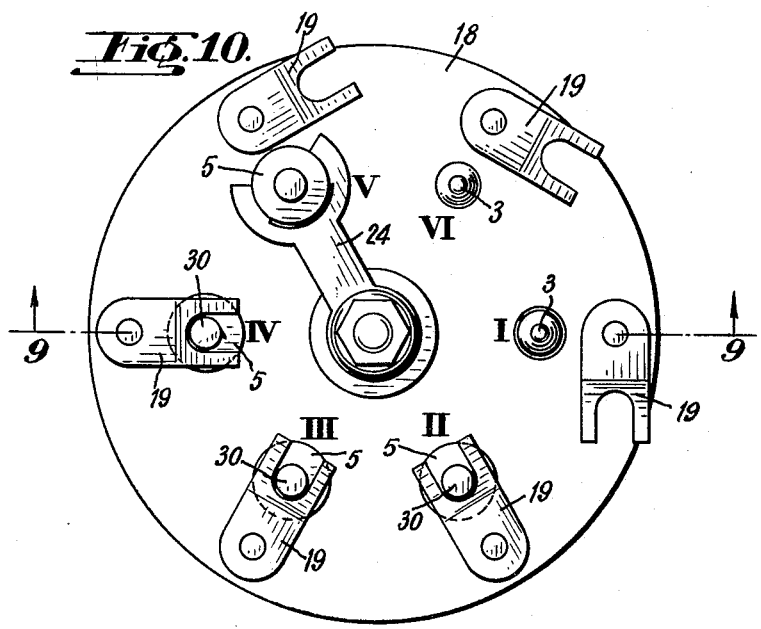

INVENTORS
Bertrand Voumard and
Paul Monnier
By Munn, Liddy, Nathanson & March
ATTORNEYS INVENTORS
Bertrand Voumard and
Paul Monnier
ATTORNEYS United States Patent Office 2,923,975
Patented Feb. 9, 1960

2,923,975

METHOD FOR MOULDING A TUBE OF PLASTIC MATERIAL, DEVICE FOR CARRYING OUT THIS METHOD AND METHOD FOR UTILIZING THIS DEVICE

Bertrand Voumard and Paul Monnier, La Chaux-de-Fonds, Switzerland, assignors, by mesne assignments, to Voumard Machines Co. S.A., La Chaux-de-Fonds, Switzerland, a corporation of Switzerland Application April 12, 1956, Serial No. 577,856

3 Claims. (Cl. 18—30)

The object of the present invention is a method for moulding a tube of plastic material, in which a tube blank is placed in a die serving to mould the head of the tube. This method is characterized by the fact that the said head is formed by injecting plastic material into the die at a spot which is at the very extremity of this blank, so as to simultaneously form this head and weld it to this extremity.

The invention also comprises a device for carrying out the abovementioned method, comprising a die destined to mould the head of the tube and a core arranged inside the said die and having a tubular body over which the tube blank is drawn.

This device is characterized by the fact that it comprises means for injecting plastic material through at least one passage leading to the spot which is at the very extremity of the tube blank.

The invention concerns, in addition, a method for utilizing the above device, characterized by the fact that the die destined to form the head of the tube is placed on the extremity of the blank drawn over the tubular body of the core, the head of the core being centered in the said die, that a passage for the flow of the plastic material is opened, that this material is injected until the space formed between the die and the head of the core is filled by the said material, that the said passage is then closed, the plastic material remaining under pressure in the die, and that the die and then the finished tube are then removed from the core.

The accompanying drawing illustrates, by way of an example, an embodiment of the method according to the invention and also shows by way of examples, two embodiments of the device according to the invention as well as variants.

Figs. 1 to 8 are cross-sectional elevations showing the successive operations of the method according to the invention.

Fig. 9 is an elevation, showing a cross-section along the line 9—9 in Fig. 10, of an apparatus for moulding tubes in a continuous fashion.

Fig. 10 is a view from above of this apparatus.

Figure 11:
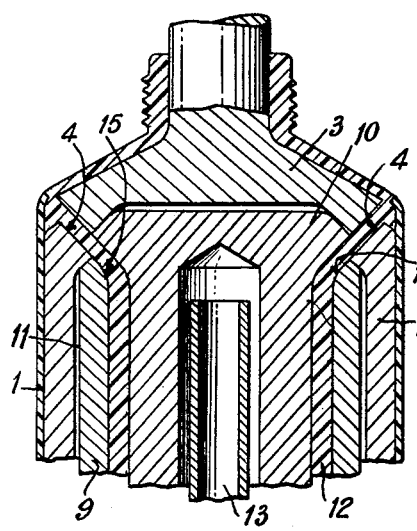
Fig. 11 is a larger scale partial axial cross-section of an embodiment of the device according to the invention.

In the method for moulding a tube of plastic material such as the one illustrated in Figs. 1 to 8, a tube blank 1 is drawn over a mandrel 2 forming the body of a core the head 3 of which is adapted to the extremity of the mandrel 2 by means of a conical surface 4. The blank 1 projects beyond the extremity of the mandrel 2 as shown in Fig. 1. This core with the blank is then placed in a die 5 (Fig. 2) which is in one piece and serves to mould the head of the tube. The core is centered by means of a cylindrical projection 6 of the head 3 of the core, which fits in a corresponding cylindrical recess 7 of the die 5. A screw thread 8 serves to form the threaded neck of the tube.

An injection nozzle formed by two parts 9 and 10 which are axially mobile in relation to one another is introduced into the core (Fig. 3). The part 9 constitutes a sleeve extending axially inside the mandrel 2 of the core leaving an intermediate space 11 for thermal insulation or for a cooling fluid. The part 10 of the nozzle constitutes an obturating member cooperating with the conical inner extremity of the sleeve 9, the annular space 12 formed between this member and the sleeve forming an annular channel for the passage of the plastic material.

A tube 13 is concentrically arranged inside a tubular rod 14 which is in one piece with the obturating member 10 and extends axially inside the sleeve 9, this tube 13 serving for the introduction of heating fluid destined to keep the plastic material contained in the channel 12 at a temperature which is either equal to or higher than the softening temperature.

The extremity of the sleeve 9 of the nozzle has a conical bearing surface 15 destined to cooperate with a corresponding surface of the obturating member 10 and a conical bearing surface 16 destined to cooperate with a corresponding surface of the mandrel 2 of the core as will be described below.

The nozzle is then opened by pushing the obturating member 10 in the upward direction as illustrated in Fig. 4. The head of the core 3 moves axially in the die 5 until the projecting part 6 is completely engaged in the corresponding recess 7. In this position, the space left between the core head 3 and the die 5 determines the shape and thickness of the tube head which is to be moulded. In addition, an annular passage is opened between the conical surfaces 4 and 15 and the corresponding surfaces of the head 3 and of the obturating member 10 respectively, establishing a communication between the interior of the core and the spot at the very extremity of the tube blank 1 where the welding has to take place. The plastic material is then injected under pressure in the channel 12 in the direction of the arrows shown in Fig. 4 and fills the space provided for the head of the tube. This head is thus simultaneously formed and welded to the extremity of the blank 1. The air contained in the moulding space is driven out through orifices or grooves, which have not been shown and which establish a communication between the upper part of this space and the outside of the die or simply through the clearance space between 5 and 6. During this operation, the plastic material is kept at the softening temperature by heating the nozzle. The die 5 may be cooled or kept at a constant temperature by fluid circulation (through ducts which have not been shown) and the tube blank 1 is thus kept at a temperature which is below the softening temperature. In certain cases, cooling is not necessary to obtain this result.

When the moulding space is full, the nozzle is closed by moving the sleeve 9 axially until its surface 15 comes to rest against the obturating member 10. The mandrel 2 follows the motion of the sleeve 9 thus closing the annular passage which has served for the injection of the material used for moulding the tube head. The plastic material contained in the die is still under pressure.

The nozzle is then withdrawn (Fig. 6). The plastic material remains under pressure owing to the fact that the mandrel 2 is maintained in contact with the head 3 of the core. The moulded tube is cooled down by contact with the die 5 and with the parts 2 and 3 and the operation of removing it from the mould can be effected. In order to do this, the one piece die is unscrewed so as to disengage the screw thread 8 as shown in Fig. 7. A mandrel 17 applied against the projecting part 6 of the head 3 in the direction of the arrow keeps the head 3 in place while the die is being removed. In order to disengage the tube, compressed air is blown into the core. The rod 17 then moves back slightly so as to allow the head 3 to move away slightly from the mandrel 2 under the influence of the pressure, and this first disengages the tube from this mandrel and then from this head.

Instead of being in one piece, the die could be made up of several parts. In this case the removal of the die is effected radially so as to disengage the screw thread from the mould. It would also be possible to provide for an axial disengagement of the die combined with a radial disengagement of the same.

In order to effect the operations described above, use can be made, for instance, of an apparatus such as the one illustrated in Figs. 9 and 10.

This apparatus comprises a rotary disk 18 carrying six cores 2, 3, in the positions I, II, III, IV, V and VI, six clamping members 19 for the dies 5 and four dies 5. A central mechanism destined to transport the dies from the position V to the position I comprises a guiding sleeve 20 mounted in a core 21 secured to the disk 18, and a rod 22 capable of sliding in the sleeve 20 and the upper extremity of which is provided with a head 23 forming a stop to limit the downward motion of the rod 22 and with an arm 24 the end of which is forked and is destined to engage the body of the die 5. This arm is axially retained on the rod 22 by means of a nut 25 screwed onto the threaded extremity 26 of this rod and of a key 27 which prevents the said arm 24 from turning round the rod 22.

The clamping members 19 are secured to the upper extremities of rods 28 which are mounted to slide and pivot in bearings 29. Each clamping member 19 is provided with an extremity in the shape of a fork which is destined to cooperate with a cylindrical projecting part 30 of the die 5.

The mechanism controlling the disk 18, the rods 28 and the central rod 22 has not been shown.

The apparatus described operates in the following fashion:

In the position I, the tube blank 1 is placed on the core 2, 3, and the die 5 is brought by the central mechanism from the position V onto the tube blank. To this end, the rod 22 is raised a certain distance, pivoted round its axis until the die is above the tube blank, and then lowered down over this blank. The disk 18 effects a rotation of ⅙ of a revolution and during this rotation the clamping member pivots through 90° in the clockwise direction from the position I and then moves down to press the die against the disk (position II).

In the position II, the injection nozzle (which is not shown) is thrust into the mandrel 2 of the core as previously described, this nozzle is opened, the plastic material is injected, the nozzle is then closed and withdrawn and the disk is made to effect ⅙ of a revolution. During the rotation of the disk from the position II to the position III, the die remains closed.

In position III, stabilization of the moulded material is effected. The disk effects a rotation of ⅙ of a revolution, the die remaining closed from position III to position IV.

In position IV, the moulded material continues to stabilize. Whilst the disk is effecting a rotation of ⅙ of a revolution in order to pass from the position IV to the position V, the clamping member 19 pivots through 90° in the anticlockwise direction in order to release the die.

In the position V the die is removed from the core and transported to the position I by the central mechanism, as already described. The clamping member 19 remains in its raised and pivoted position during the rotation of the disk from the position V to the position VI.

In this last position VI, the moulded tube is ejected.

The disk effects a rotation of ⅙ of a revolution with the clamping member 19 remaining in its raised position, so as to return to the position I, and the cycle of operations can begin over again.

It is obvious that a large number of variants could be applied to the cycle described above; for instance, the number of stations could be increased, which would allow the rhythm of production to be accelerated by reducing the time for each of the stations.

The number of stabilizing stations could also be increased or reduced if the cooling is accelerated by a stream of air or even by a stream of carbonic snow.

The clamping mechanism for the dies could be designed in another manner, for instance it could be hydraulically controlled, or by means of a toggle joint or of levers, etc.

In addition the clamping and releasing operations could be effected at stations reserved for this purpose.

The larger scale Figs. 11 to 14 illustrate variants of the tube moulding device, in a stage intermediate between those shown in the Figs. 4 and 5. The die 5 has not been shown in order not to impair the clearness of the drawing. In Fig. 11 one again finds the blank 1 drawn over the mandrel 2 of the core, the head 3 of which has been separated from this mandrel in order to form the annular passage through which the plastic material is brought to the spot at the very extremity of the blank 1. The sleeve 9 of the nozzle which is thermically insulated from the mandrel 2 by the space 11, is also separated from the obturating member 10, its conical surface 15 coinciding with the conical surface 4 of the mandrel 2 in order that the annular passage may be left free. The head of the tube has just been moulded and simultaneously welded to the blank 1, the said annular passage and the channel 12 of the nozzle being still filled with plastic material.

Figure 12:
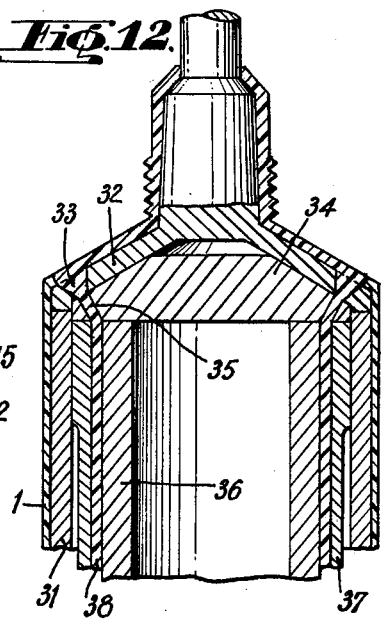
Figs. 12 to 14 are similar views of variants.

In the variant shown in Fig. 12, the core comprises a mandrel 31 to which is adapted a head 32 of the core. The mandrel 31 could also be in one piece with the head 32. Holes 33 widening towards the exterior are pierced in the head 32 in the neighborhood of the extremity of the mandrel 31 over which the tube blank 1 is drawn, so as to bring the plastic material to the spot at the very extremity of the blank 1. It will be noted that the inner generant of each hole 33 is parallel to the longitudinal axis of the core, in order to facilitate removal from the mould. In this variant, the injection nozzle comprises an obturating member 34 pierced with holes 35 corresponding to the holes 33. Concentric sleeves 36 and 37 determine an annular channel 38 through which the plastic material is brought to the holes 35. When the head of the tube has been moulded, the obturating member 34 is rotated in order to close the holes 33. The finished tube is then provided on the inside with peripheric projecting parts formed by the plastic material which has remained in the holes 33.

Figure 13:
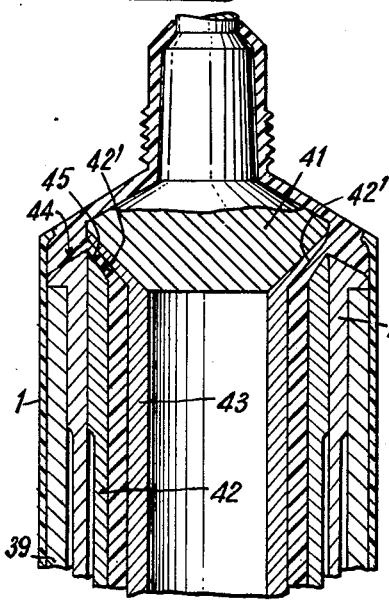

In the variant shown in Fig. 13, the core comprises a mandrel formed by two sliding parts of which one 39 is fixed and receives the tube blank 1 and the other 40 can be moved between the fixed part 39 and the head 41 of the core. The nozzle comprises a sleeve 42 mounted in the moving part 40 of the mandrel of the core and an obturating member 43 the expanded head of which adapts itself on the head 41, an annular passage 45 being left free between the member 43 and the conical surface 42' of the sleeve 42. The moving part 40 of the mandrel of the core is provided with a conical surface 44 which is destined to prolong the conical surface of the head 41 defining the inner surface of the head of the tube. When this head has been moulded, the sleeve 42 is raised with the mobile part 40 until the conical surface 42' is pressed against the corresponding surface of the member 43, thus closing the annular passage 45.

Figure 14:
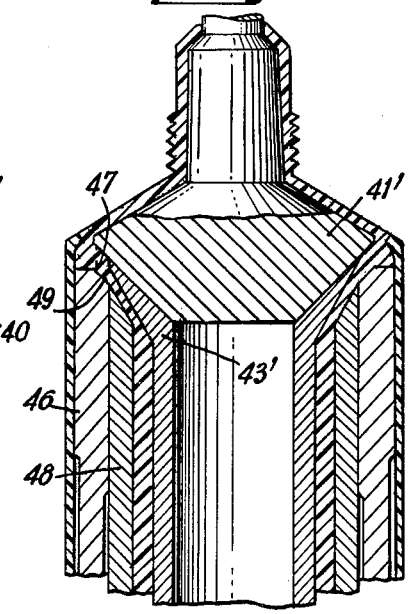

In the variant shown in Fig. 14, the core comprises a mobile sleeve 46 provided with a conical surface 47 on the inner side which together with the mobile sleeve 48 of the nozzle determines an annular passage 49 for the injection of the plastic material. As in the variant shown in Fig. 13, the sleeve 48 is provided with a conical surface destined to come in contact with the corresponding surface of the obturating member 43' in order to close the passage 49. As it moves upwards, the sleeve 46 closes the passage when it comes in contact with the conical surface of the head 41'.

In the method described, the plastic material is injected under pressure from the inside of the tube blank. The case will now be described, where the plastic material is injected from the outside of the blank, but as always at a spot which is at the very extremity of this blank in order to form the head of the tube and simultaneously weld it to this extremity.

Figure 15:
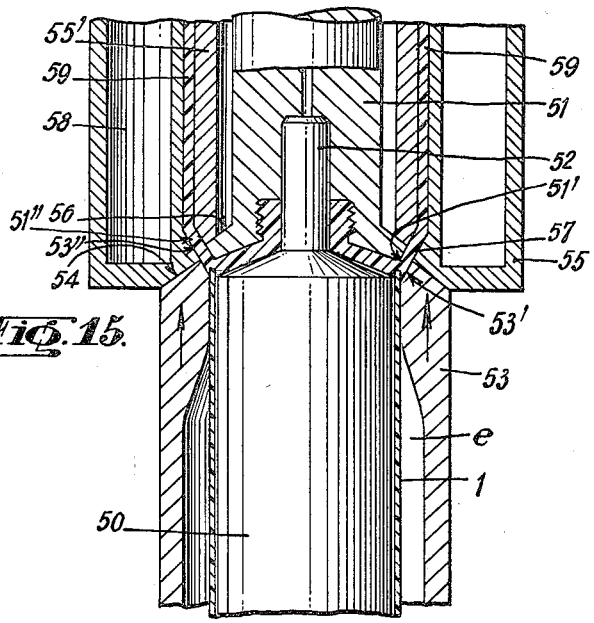
Fig. 15 is a partial axial cross-section of a second embodiment of this device.

Fig. 15 shows an embodiment of the device allowing the head of the tube to be moulded from the outside of the blank. This device comprises a core 50 which is in one piece and carries the tube blank 1, and a die comprising, on the one hand, a head 51 which is centered on an axial cylindrical projection 52 of the core 50, and on the other, a sleeve 53 which can be moved axially and part of the interior surface of which comes into contact with the tube blank 1 in the neighborhood of the extremity where the welding occurs. The remainder of the interior surface of the sleeve 53 is then spaced from the tube blank in order to leave an empty space e. This sleeve 53 is provided at the end adjacent to the head 51, with a conical surface 53' destined to cooperate with a corresponding conical surface 51' of the head 51 and with a conical surface 54 destined to press against a corresponding surface of the exterior part 55 of an injection nozzle, 55' indicating an obturating member of the nozzle. The head 51 of the die is also provided with a conical surface 56 cooperating with a corresponding surface of the obturating member 55'. The exterior part 55 of the nozzle and its obturating member 55' comprise, in addition, conical cooperating surfaces 53'', respectively 51'' which, in the position shown in Fig. 15 prolong the conical surfaces 53', respectively 51'.

The sleeve 53 is shown separated from the head 51 by an annular space 57 for the passage of the plastic material injected through the nozzle in view of the formation of the head of the tube. The exterior part 55 of the nozzle comprises an annular chamber 58 for a heating fluid destined to keep the plastic material at a temperature above the softening temperature in an annular space 59 provided between the chamber 58 and the obturating member 55' and in communication with the passage 57.

When the injection of plastic material terminates and the free end of the tube blank 1 is welded to the head of the tube as previously described, the sleeve 53 and the exterior part 55 of the nozzle are moved axially in the direction of the arrows until the surfaces 53' and 53'' are pressed against the surfaces 51' and 51'' respectively. The passage 57 is thus closed as is the extremity of the annular space 59 of the injection nozzle thus allowing the latter to be withdrawn without any plastic material escaping. Fig. 15 illustrates the phase of the method which follows the injection of the plastic material and precedes the closing of the passage 57.

In order to enable the finished tube to be taken out of the mould, the nozzle is withdrawn, and the sleeve 53 is then moved away from the head 51, which, in its turn, is separated from the core by unscrewing it, the tube being then withdrawn from the core as previously described.

Figure 16:
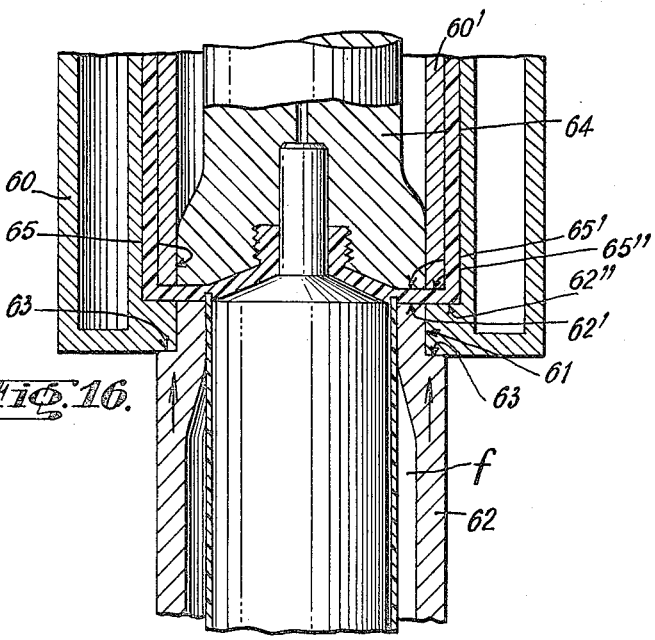
Fig. 16 is a similar view of a variant of this embodiment.

In the variant shown in Fig. 16, the exterior part 60 of the injection nozzle is adapted to a cylindrical face 61 formed at the extremity of a sleeve 62 similar to the sleeve 53 of Fig. 15 and surrounding the tube blank 1 whilst leaving an intermediate empty space f. A shoulder 63 retains the part 60 in the downward direction.

The head 64 of the die is provided with a cylindrical surface 65 having the same diameter as the face 61 and to which an interior obturating member 60' of the injection nozzle is adapted so as to form a joint. A plane annular surface 65' of the head 64 is destined to cooperate with a corresponding surface 62' of the sleeve 62. The exterior and interior parts 60 and 60' of the nozzle are also provided with cooperating plane surfaces 62'', respectively 65'' destined to be pressed one against the other when the sleeve is moved axially in the direction of the arrows in order to close the nozzle.

The mode of operation of this variant is the same as that of the embodiment shown in Fig. 15.

By injecting the plastic material at the extremity itself of the tube blank in order to form the head of the tube by the method described, a softening of the said extremity is advantageously obtained which is in favor of a satisfactory weld. In the usual methods in which the head of the tube is injected axially by the upper extremity, the material cools down, and all that is obtained is an adherence of this head to the extremity of the blank, rather than a weld as is the case in the method described.

What we claim is:

1. An apparatus for molding a dispensing head into a tubular blank of plastic material comprising: cooperable inner and outer mold parts adapted to be vertically superimposed, the inner of said mold parts comprising a mandrel upon which the tubular blank is adapted to be placed, the outer of said mold parts constituting a die, said mandrel having an upper peripheral surface extending outwardly from the interior thereof at an angle to the longitudinal axis of said mandrel, said surface extending to the outer periphery of said mandrel at the upper end thereof, said mandrel being adapted to be inserted upwardly into said die and said die having a downwardly extending opening adapted to receive said mandrel in closely spaced relationship therewith but spaced apart therefrom sufficiently to receive said blank between said die and said mandrel, said mandrel being adapted to be placed upwardly into said die with said blank extending above the top thereof and above said peripheral surface and with said mandrel facing an upper surface of the mandrel receiving opening of said die, a head for said mandrel positioned at the upper end of said mandrel, said head normally resting on said upper peripheral surface of said mandrel when the latter is in vertical position, said mandrel being hollow, said head normally closing the top of said hollow mandrel when bearing against said surface, means within said mandrel contacting said head and adapted upon upward movement to raise the head of the body of said mandrel, the latter means being spaced from the inner wall of said mandrel throughout substantially its entire length beneath said head, said head having a lower surface facing the first mentioned surface and adapted to form a peripheral conduit extending peripherally around said mandrel adjacent the top thereof when the said head is raised above said mandrel.

2. The molding apparatus of claim 1 wherein the last named means comprises a rod, an obturating member, the latter member being mounted adjacent the end of said rod and being connected to said rod and normally facing the bottom of said head, said obturating member extending inwardly from said lower surface of said head and being in contact with said head adjacent the latter surface through the length of the latter, said obturating member having a lower surface aligned with said lower surface of said head and facing downwardly of said mandrel and adapted to form a continuation of the upper portion of said conduit when said head is raised by said rod and obturating member.

3. The molding apparatus of claim 2 including a sleeve member extending upwardly in said mandrel in spaced relation to the outer wall thereof and forming with the latter wall a chamber for receiving cooling fluid, the latter means being spaced inwardly of said sleeve and forming an inner space therewith within said mandrel, said sleeve having an upper surface aligned with said upper surface of said mandrel and forming a continuation thereof and abutting said lower surface of said obturating member when said obturating member and said head are in the position in which said head closes the top of said mandrel.

References Cited in the file of this patent

UNITED STATES PATENTS

| | | |
|---|---|---|
| 2,673,374 | Strahm | Mar. 30, 1954 |
| 2,801,444 | Lorenian | Aug. 6, 1957 |

FOREIGN PATENTS

| | | |
|---|---|---|
| 144,920 | Australia | Feb. 1, 1952 |
| 1,091,191 | France | Oct. 27, 1954 |